Figure 1:
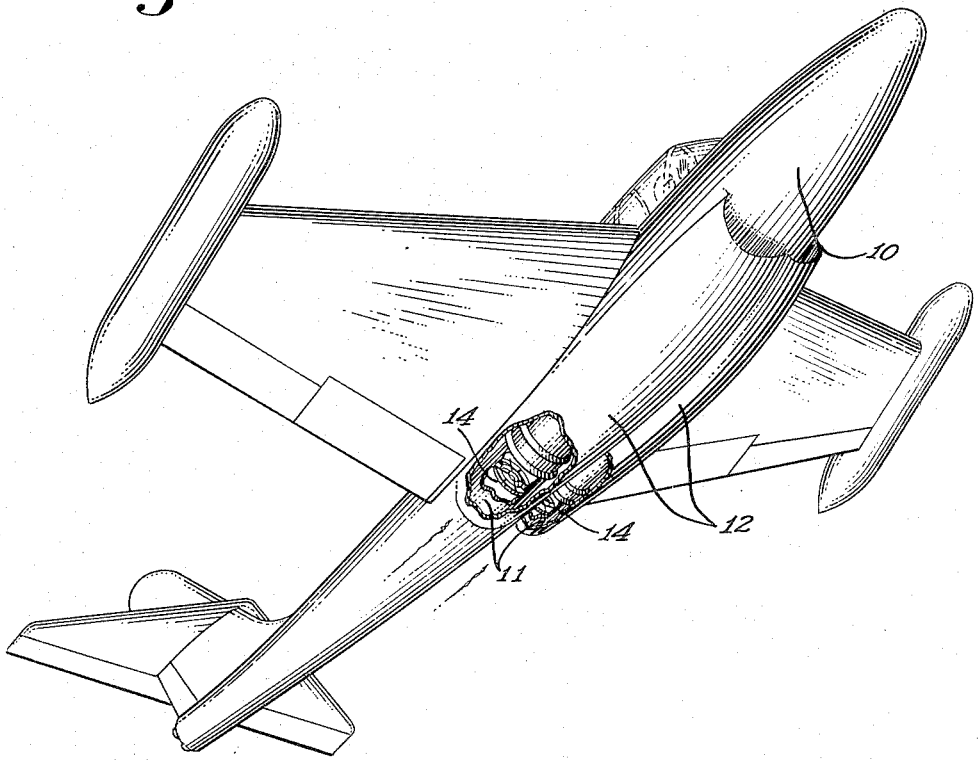

Sept. 4, 1956 J. JONAS ET AL 2,761,278
FUEL FLOW CONTROL FOR A JET ENGINE AFTERBURNER
Filed Jan. 8, 1951
2 Sheets-Sheet 1

INVENTORS:
JULIUS JONAS
JOE L. BYRNE

By Herbert E. Metcalf
THEIR PATENT ATTORNEY

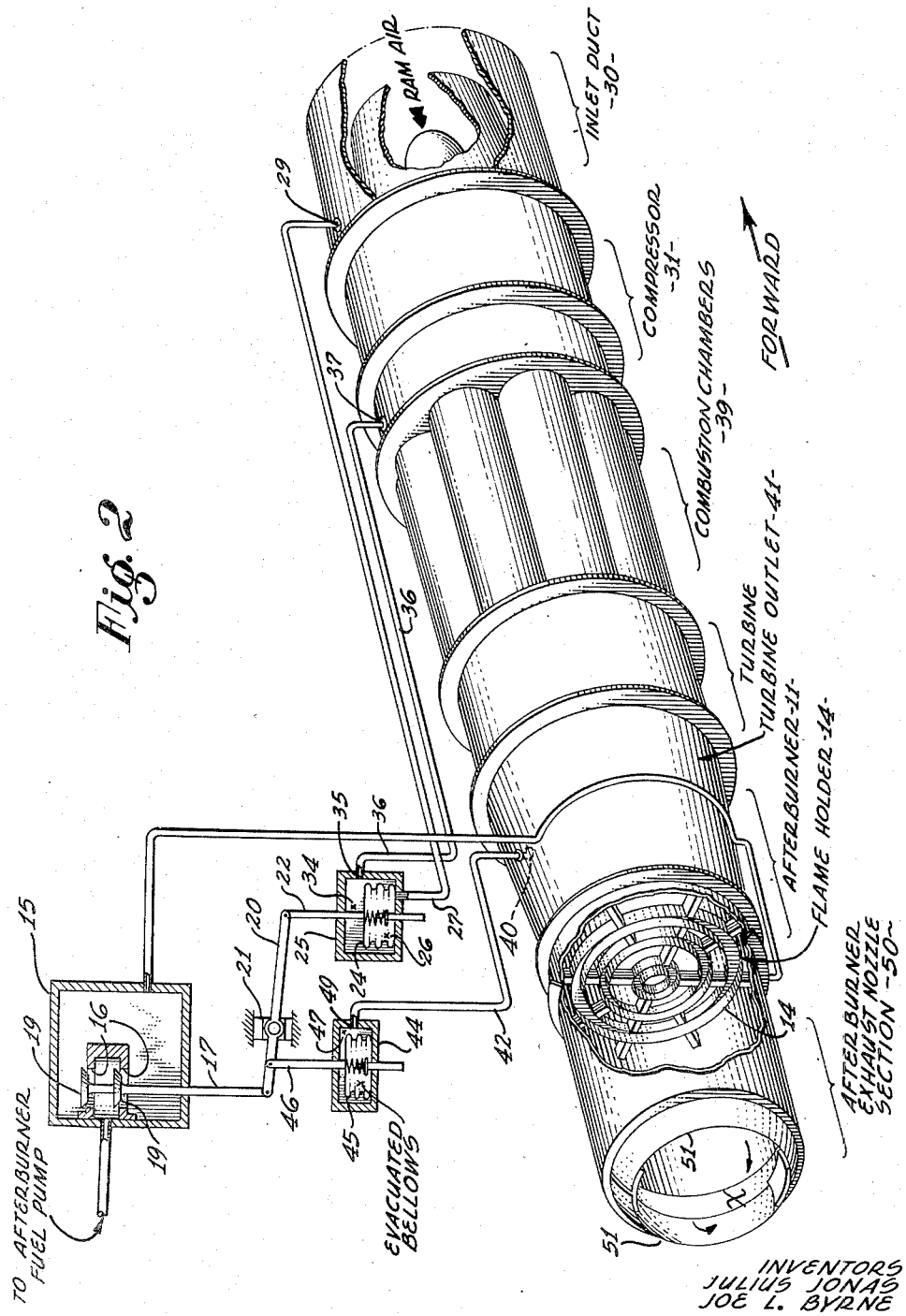

United States Patent Office 2,761,278
Patented Sept. 4, 1956

2,761,278

FUEL FLOW CONTROL FOR A JET ENGINE AFTERBURNER

Julius Jonas, Los Angeles, and Joe L. Byrne, Gardena, Calif., assignors to Northrop Aircraft, Inc., Hawthorne, Calif., a corporation of California Application January 8, 1951, Serial No. 204,900

3 Claims. (Cl. 60—35.6)

The present invention relates to turbojet engine controls, and, more particularly, to a means for automatically controlling the flow of fuel to a turbojet afterburner.

Turbojet engines, without afterburners, as used to power jet propelled aircraft, burn only about 25% of the oxygen in the air passing through the engine.

Afterburners, essentially comprised of a flame-holder, tailpipe extension, jet exhaust nozzle, and a separate fuel system, are in wide use in combination with turbojet engines, and are usually attached to the end of the turbojet tailcone and extend rearwardly therefrom.

Afterburners operate under control of the pilot by burning the unused oxygen in the turbine discharge gases. The additional combustion in the afterburner provides substantial trust augmentation and is used for relatively short periods during take-off, climb, and combat tactics.

Thus the afterburner forms an integral part of the engine. The pilot control for the afterburner is preferably associated with the engine throttle control which is mounted in the cockpit of the airplane and comprises the conventional throttle lever movable over a throttle cam for control of the flow of fuel to the engine. The "Afterburner on" energization control is preferably positioned at the end of the maximum R. P. M. range of the throttle cam.

When the engine is in operation the afterburner system is always armed, i. e. ready for operation, and the positioning of the throttle lever by the pilot to start the afterburner is made by manually advancing the throttle lever over the throttle cam into the "Afterburner on" range to fire the burner. Fuel is delivered to the afterburner system and ignited by igniter plugs which function only during the starting phase of afterburner operation. The fuel regulator operates under all conditions where the afterburner is on.

In order to supply the afterburner with the proper amount of fuel for the maximum allowable thrust augmentation, various turbojet engine operating conditions should be accurately measured and related to the afterburning process to insure maximum performance in the turbojet and afterburner combination during all operating conditions with respect to speed, altitude, and ambient air temperature.

Control and regulation of the afterburning operation, after the initial energization thereof, is performed by means of an automatic fuel flow control system which includes a balanced regulating valve installed in the fuel supply line which, in conjunction with a spring-loaded by pass valve, maintains a constant fuel pressure drop across the balanced valve for all operating conditions, thus making the fuel flow through the balanced valve directly proportional to the balanced valve operating area. This valve opening is positioned by a bellows arrangement which senses the air pressure across the compressor of the engine. Because the air pressure rise is substantially directly proportional to the engine air flow, fuel is delivered to the afterburner in substantially direct proportion to the engine air flow which, as is well known in the art, is the criterion for efficient afterburner operation.

A proper afterburning process will result in maximum allowable thrust augmentation only if limiting engine turbine discharge gas temperatures are maintained. Under non-afterburning or afterburning conditions at a given jet nozzle mass air flow and mach number, a given turbine discharge temperature corresponds to a given fixed turbine discharge gas pressure. We have found through theoretical and experimental turbojet engine cycle analyses, however, that combining turbine discharge gas temperature values with the values of compressor air pressures does not form a practical basis for controlling the flow of fuel to the afterburner, such as to provide a proper afterburning process. Turbine discharge gas pressure values, however, in combination with values of compressor air pressures, have been found eminently satisfactory under actual operating conditions for the control of fuel to the afterburner.

Thus, under afterburning conditions, in order to obtain limiting turbine temperatures, as in the non-afterburning case, it is only necessary to burn enough fuel to create a turbine discharge gas pressure equal to that which, under non-afterburning conditions, will give the essential limiting turbine discharge temperature.

We have found that if the measurements of compressor inlet and outlet air pressures are correlated with engine turbine discharge gas pressure to form a basis for afterburner fuel flow control, fuel will be supplied to the afterburner in the correct amounts for a proper afterburning process, resulting in the maximum allowable thrust augmentation.

It is an object of the present invention to provide an automatic fuel flow control system for turbojet afterburners, based upon the finding as described above, which will insure a proper afterburning process and provide maximum thrust augmentation during all operating conditions.

Briefly, the present invention comprises an afterburner fuel flow control valve regulated by coordinated measurements of the engine compressor inlet air pressure, engine compressor outlet air pressure, and engine turbine discharge gas pressure as developed during all conditions of operation and flight.

The present invention will be more clearly understood by referring to the accompanying drawings, wherein:

Figure 1 is a perspective view of a twin jet propelled U. S. A. F. F–89 fighter aircraft with the engine nacelles partially cut away to show the afterburner installations and the afterburner flame-holders.

Figure 2 is a partially cut away view in perspective, of a turbojet and afterburner combination as used in the airplane of Figure 1 with the fuel system shown in a somewhat schematic diagram for clarity.

In Figure 1, the aircraft 10 is equipped with afterburners 11 which are attached to the tailcones of turbojet engines (not shown in this figure) housed in the nacelles 12. The flame-holder fuel manifold 14 of each afterburner receives fuel through a separate control system which is described below.

Referring to Figure 2, fuel is metered to the afterburner flame-holder fuel manifold 14 through a control valve 15 having a number of valve ports 16 controlled by a valve poppet 17 provided with discs 19 adapted to seat into the ports 16. The poppet 17 is axially movably positioned within the ports 16 to regulate the flow of fuel therethrough in accordance with coordinated engine air and exhaust gas pressure measurement signals as later described.

The poppet 17 extends through the valve 15 and pivotally connects to one end of a hinge arm 20 which is movably fastened to a central airframe pivot 21 intermediate the ends and is rockable thereabout. A control rod 22 connecting a spring-loaded force bellows 24, passes through an airtight casing 25 and pivotally attaches the other end of the hinge arm 20. The spring-loaded force bellows 24, enclosed within the airtight casing 25, reacts to air pressure measurements which are admitted into the bellows pressure chamber 26 through a pressure line 27 connecting the bellows pressure chamber 26 to a first pressure pickup 29 positioned in the engine compressor inlet duct 30 to sense and measure the pressure of the air entering the compressor 31. The casing 25 is provided with a pressure chamber 34 having an inlet 35 connected by a pressure line 36 to a second pressure pickup 37 positioned intermediate the engine compressor 31 and combustion chambers 39 to sense and measure the value of air pressure discharged from the engine compressor 31 entering the combustion chambers 39. Air pressure change across the compressor outlet is sensed and measured by the second pressure pickup 37 to react against the force bellows 24 and the force produced in the bellows pressure chamber 26 over the spring-load by the air pressure measurement from the first pressure pickup 29 in the compressor inlet duct 30. The differential between the compressor inlet air pressure and the compressor outlet air pressure compared by the spring-loaded bellows 24 and casing pressure chamber 34 acts to move the control rod 22 in accordance therewith and the connected hinge arm 20 which in turn adjusts the position of the poppet 17, regulating the flow of fuel to the afterburner in relation to the air pressure differential. A control in direct proportion to compressor air pressure differential is thereby provided in the form of a first adjustment.

A third pressure pickup 40 is positioned adjacent the engine turbine outlet 41 to sense and measure turbine discharge gas pressure. A pressure line 42 connects the third pressure pickup 40 to a second airtight casing 44 which encloses a sealed evacuated spring-loaded bellows 45, having a control rod 46 connected thereto which passes axially through the casing 44 and pivotally connects to the hinge arm 20 intermediate the central airframe pivot 21 and the end connecting the valve poppet 17. A pressure chamber 47 in the second casing 44 is provided with an inlet 49 to receive turbine discharge gas pressure measurements from the pressure line 42 connecting the third pressure pickup 40. The turbine discharge gas pressure reacting upon the force bellows 45 over the spring-load produces a modifying force which moves the rod 46 in accordance therewith. The modifying force is exerted upon the hinge arm 20 by the control rod 46 connecting the force bellows 45 and hinge arm 20 providing a secondary control to the afterburner fuel supply in accordance with the turbine discharge gas pressure value.

The exhaust nozzle area $x$ is controlled by shutters 51 which automatically open during afterburning operation and automatically close during non-afterburning operation, by means of a scissor linkage (not shown) which is automatically actuated in accordance with changes in tailpipe gas pressure. This variable area nozzle and the actuating mechanism therefor, forms no part of the present invention, and reference thereto is made only to lay the basis for the symbol "$A_n$" which appears in Table I which follows later.

The evaluation of engine dynamic characteristics and the thermodynamic relationship therebetween, to determine the amount of fuel required for an efficient afterburning process under all conditions of engine operation, can best be summed up by the following observations and equations using the symbols shown in Table I.

Table I.—Symbols $W_a$ = Engine air flow
$W_f$ = Engine fuel flow (non-afterburning)
$T_n$ = Exhaust nozzle temperature, absolute
$T_{td}$ = Turbine discharge temperature, absolute
$A_n$ = Non-afterburning nozzle area
$P_n$ = Exhaust nozzle total pressure, absolute
$P_{td}$ = Turbine discharging pressure, absolute
$\Delta P_c$ = Compressor air pressure rise
$\Delta P_{td}$ = Pressure drop in tailpipe
$C_1, C_2 \ldots C_8$ = Constants
$l, m$ = Hinge moment arms $$\sigma = \frac{P_{td}}{P_{sl}} \times \frac{T_{sl}}{T_{td}} = \text{Gas density ratio at turbine discharge}$$

$T_{sl}$ = Standard atmospheric temperature at sea level, absolute.
$P_{sl}$ = Standard atmospheric pressure at sea level, absolute.

Under non-afterburning conditions the following relationship holds true when critical pressure ratios are obtained in the jet tailpipe exhaust nozzle 50 which is the case under operating flight conditions:

$$\frac{(W_a + W_f)\sqrt{T_n}}{P_n \times A_n} = C_1 \tag{1}$$

Under non-afterburning conditions $$T_{td} = T_n$$

$$P_{td} = P_n + \Delta P_{tp}$$

$$\frac{W_f}{W_a} = C_2$$

Thus $$\frac{W_a(1+C_2)\sqrt{T_{td}}}{(P_{td} - \Delta P_{td})A_n} = C_1 \tag{2}$$

Since $T_{td}$ is desired to be constant and $A_n$ is fixed as well let $$\frac{C_1 A_n}{(1+C_2)\sqrt{T_{td}}} = C_3$$

Thus $$\frac{W_a}{(P_{td} - \Delta P_{tp})} = C_3 \tag{3}$$

Further $$W_a = C_4 \Delta P_c \tag{4}$$

where $C_4$ is an empirical constant determined from engine performance data also $$\sigma \Delta P_{tp} \sim W_a^2$$

Since $T_{td}$ is constant $$\sigma \sim P_{td}$$

thus $$\Delta P_{tp} = C_5 \frac{W_a^2}{P_{td}} \tag{5}$$

where $C_5$ is a constant of proportionality. Approximating Equation 3 for the purpose of Equation 5 only, it follows with sufficient accuracy that $$\frac{W_a}{P_{td}} = C_6$$

and further using Equation 4, Equation 5 becomes $$\Delta P_{tp} = C_7 \Delta P_c \tag{6}$$

where $C_7$ is a constant of proportionality. Thus substituting Equation 4 and 6 into 3 it follows that $$\frac{C_4 \Delta P_c}{(P_{td} - C_7 \Delta P_c)} = C_3 \tag{3'}$$

or re-arranging $$\frac{P_{td}}{\Delta P_c} = \frac{C_4 + C_3 C_7}{C_3} = C_8 \tag{7}$$

Thus it is demonstrated with sufficient accuracy that in order to maintain limiting engine turbine discharge temperatures during afterburning Equation 7 must be satisfied. Since $\Delta P_c$ is independent of afterburning operation, the control device herein disclosed will satisfy Equation 7 by controlling the afterburner fuel flow until a value of $P_{td}$ is attained such as to give $$\frac{P_{td}}{\Delta P_c} = \text{Constant} = C_8$$

It is apparent, therefore, that the present invention provides an automatic fuel flow to a jet engine afterburner in constant proportion to the engine operation under substantially all conditions in accordance with the principle that $$P_{td} \times 1 = \Delta P_c \times m$$

or $$\frac{P_{td}}{\Delta P_c} = \frac{m}{1} = C_8$$

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In an automatic fuel flow control system for an afterburner in conjunction with a jet engine having in general order an air inlet, a compressor, combustion chambers, and a gas turbine, a fuel flow line to said afterburner, a valve to be controlled in said fuel flow line, a first pressure pickup positioned in said jet engine to sense and measure compressor inlet air pressure, a second pressure pickup positioned in said jet engine to sense and measure compressor outlet air pressure, a third pressure pickup positioned in said jet engine to sense and measure turbine discharge gas pressure, a movable member, means for connecting said first member to said first pressure pickup to be moved in one direction, means for connecting said first member to said second pickup to be moved in the opposite direction to obtain a movement representing the differential of the pressures from said first and second pickup, a second movable member, means for connecting said second movable member to said third pressure pickup to be moved thereby, means for connecting said first and second members in opposition, and means for controlling said valve by the resultant movement.

2. In an automatic fuel flow control system for an afterburner in conjunction with a jet engine having in general order an air inlet, a compressor, combustion chambers, and a gas turbine, a fuel flow line to said afterburner, a valve to be controlled in said fuel flow line, a first pressure pickup positioned in the jet engine to sense and measure compressor inlet air pressure, a second pressure pickup positioned in the jet engine to sense and measure compressor outlet air pressure, a third pressure pickup positioned in the jet engine to sense and measure turbine discharge gas pressure, a lever connecting said valve at one end thereof to control said valve, said lever pivoted around an axis intermediate the ends thereof, first controlling means communication with said first and second pressure pickups to compare the values of air pressures sensed and measured thereby to obtain the differential thereof, means to translate said differential into motion, said latter means being connected to said lever at the end opposite the end connecting said valve and moving said valve in accordance with said differential, second controlling means communicating with said third pressure pickup to translate pressure into motion, said second controlling means being connected to said lever intermediate the axis and the end connected with said valve to modify the control of said first controlling means, in accordance with said turbine discharge gas pressure measurement.

3. In an automatic fuel flow control system for an afterburner in conjunction with a jet engine having in general order an air inlet, a compressor, combustion chambers, and a gas turbine, a fuel flow line to said afterburner, a valve to be controlled in said fuel flow line, a supply port in said valve, a poppet axially positioned in said port and movable therein, said poppet having a disc cooperating with said port to regulate the flow of fuel therethrough, a first pressure pickup positioned in the jet engine to sense and measure compressor inlet air pressure, a second pressure pickup positioned in the jet engine to sense and measure compressor outlet air pressure, a third pressure pickup positioned in the jet engine to sense and measure turbine discharge gas pressure, a hinge arm pivotally connecting said valve at one end thereof, said hinge arm fixed intermediate the ends thereof to pivot around an axis, a first casing having a pressure chamber communicating with said second pressure pickup, a bellows enclosed in said first casing, said bellows adapted to communicate with said first pressure pickup, a control rod connected to said bellows, said control rod passing through said first casing to pivotally connect to the end of said hinge arm opposite the end of said hinge arm connected to said valve, said bellows moving said control rod in accordance with the ratio of difference between said compressor inlet air pressure measurement and said compressor outlet air pressure measurement, a second casing having a pressure chamber communicating with said third pressure pickup, a bellows enclosed in said second casing, said bellows being sealed and evacuated, a control rod connected to said bellows, said control rod passing through said second casing to pivotally connect to said hinge arm intermediate the hinge arm axis and the end connected to said valve, said bellows moving said control rod connecting said hinge arm in accordance with said turbine discharge gas pressure measurement thereby modifying the control of said valve by said first and second pickups.

References Cited in the file of this patent
UNITED STATES PATENTS

| | | |
|---|---|---|
| 2,422,808 | Stokes | June 24, 1947 |
| 2,442,049 | Lee | May 25, 1948 |
| 2,531,780 | Mock | Nov. 28, 1950 |
| 2,700,275 | Chandler et al. | Jan. 25, 1955 |